United States Patent [19]

Benge et al.

[11] Patent Number: 4,808,482

[45] Date of Patent: Feb. 28, 1989

[54] MULTI-LAYER PLASTICS STRUCTURES AND APPARATUS AND METHODS FOR THEIR MANUFACTURE

[75] Inventors: Terence A. Benge, Farringdon; Cyril M. Prince, Witney, both of United Kingdom

[73] Assignee: Metal Box Public Limited Company, England

[21] Appl. No.: 11,895

[22] Filed: Feb. 6, 1987

Related U.S. Application Data

[62] Division of Ser. No. 631,195, Jul. 16, 1984, Pat. No. 4,652,325.

[30] Foreign Application Priority Data

Jul. 16, 1983 [GB] United Kingdom ................. 8319348

[51] Int. Cl.$^4$ ............................................. B32B 9/04
[52] U.S. Cl. ............................ 428/411.1; 156/244.11; 156/244.12; 156/244.22; 156/244.27; 264/37; 428/36.7; 428/220; 428/480; 428/483; 428/500; 428/515; 428/516; 428/517; 428/518; 428/519; 428/520; 428/521; 428/522; 428/903.3
[58] Field of Search ............... 428/35, 212, 213, 220, 428/411.1, 480, 483, 500, 515, 516, 517, 518, 519, 520, 521, 522, 903.3; 264/37, 38; 156/244.12, 244.22, 244.27, 244.11

[56] References Cited

U.S. PATENT DOCUMENTS

| | | | |
|---|---|---|---|
| 3,940,001 | 2/1976 | Haefner et al. | 428/2 |
| 4,234,663 | 11/1980 | Catte et al. | 428/517 |
| 4,476,080 | 10/1984 | Komoda et al. | 156/244.11 |
| 4,705,708 | 11/1987 | Briggs et al. | 428/35 |

Primary Examiner—Edith Buffalow
Assistant Examiner—James B. Monroe
Attorney, Agent, or Firm—Diller, Ramik & Wight

[57] ABSTRACT

A multilayer plastics sheet destined to be formed into foodstuff containers by thermoforming has a barrier layer for low oxygen permeability, and incorporates reclaim material for providing desired mechanical properties to the sheet. The reclaim material represents 40–60% of the sheet by volume, and in order to incorporate these high reclaim levels without concomitant organoleptic problems the reclaim material is formed as a single layer adjacent what is to be the outside surface of the container. The sheet is accordingly highly asymmetric, but any substantial polymer melt instability during coextrusion tending to cause layer thickness variation and lack of visual appeal of the sheet is prevented by forming the sheet as two substantially symmetrical components which are individually and separately coextruded, and subsequently extrusion laminated together. Of the components one includes, and is symmetrical in relation to, the barrier layer, and the other likewise incorporates the reclaim layer.

10 Claims, 2 Drawing Sheets

MULTI-LAYER PLASTICS STRUCTURES AND APPARATUS AND METHODS FOR THEIR MANUFACTURE

This application is a division of application Ser. No. 631,195 filed July 16, 1984, now U.S. Pat. No. 4,652,325.

The present invention relates to multilayer structures formed of thermoplastics polymers, and to apparatus and methods of manufacturing such structures.

The invention is of particular application to multilayer plastics sheet materials, especially (but not necessarily) sheet materials for the production of plastics packaging containers by thermoforming, but it may also have application to multilayer plastics tubes, for example for the manufacture of plastics bottles and container bodies.

It is well known to produce a multilayer plastics structure by coextrusion, that is, by separately plasticating the various polymers of the structure by heat and mechanical action to produce separate polymer melts, combining the polymer melts together to form a single polymer stream in which the polymer melts are discrete but in intimate mutual contact, and forcing the composite polymer stream under pressure through the orifice of an extrusion die. The stream emerging from the die orifice forms the desired multilayer structure after cooling and polishing or other finishing operation. The combination of the polymer melts is usually achieved in what is refered to as a "feed block".

In the manufacture of multilayer plastics structures by coextrusion it is a known desideratum to incorporate so-called "reclaim" material into the structure to reduce material costs. The reclaim material is typically a colour contaminated polymer or a mix of different polymers. One example of reclaim material in the latter category is skeletal waste left after a multilayer plastics sheet material including a layer of the reclaim has been passed through a thermoforming machine in the manufacture of packaging containers. The skeletal waste is re-granulated for use as feedstock for a layer of the multilayer plastics structure.

Symmetrical multilayer sheet materials have been manufactured incorporating reclaim material which is disposed in two layers, one on each side of a central barrier layer provided to minimise gas and liquid transmission through the sheet material. The reclaim itself is provided essentially as a filling or bulking layer to provide rigidity and impact resistance for the sheet in its eventual use. An example of a sheet material which includes barrier and reclaim layers is formed in seven layers arranged in sequence as follows:

| Layer | Material | % volume of structure |
|---|---|---|
| 1 | Polyolefin | 10–25 |
| 2 | Reclaim | 20–30 |
| 3 | Adhesive | 1–4 |
| 4 | Barrier | 2.5–10 |
| 5 | Adhesive | 1–4 |
| 6 | Reclaim | 20–30 |
| 7 | Polyolefin | 10–25 |

Unfortunately, such a symmetrical arrangement places a layer of reclaim material adjacent each of the surfaces of the sheet material, and this creates a potential organoleptic problem, particularly in the case of long-term storage, if the sheet material is to be used for the manufacture of a foodstuff container, e.g. by thermoforming, and the reclaim includes an organoleptically undesirable substance.

Manufacturing an asymmetric plastics sheet material in which the reclaim material is formed as a single layer to be located as far as possible from the "inside", food-contacting surface of the sheet solves the above problem, but experience has shown that such a structure is difficult to produce satisfactorily by coextrusion, due to instability of polymer flow within the multilayer polymer streams passing to the die orifice.

This flow instability, which is believed to be due in large part to the effect of the asymmetry of the structure on the differences in the rheological properties of the polymer melts, may result in gross thickness variations of the component layers in the multilayer structure, even though the overall thickness of the structure itself may be within the specified tolerance limits.

As is manifest from the example tabulated above, because of the high cost of the polymer of which it is made the barrier layer will usually represent only a small proportion of the thickness of the structure. For example, in a sheet structure having a thickness of 2 mm (which is a typical thickness for a multilayer sheet destined for the production by thermoforming of high-barrier plastics containers), the nominal thickness of the barrier layer will usually be only 0.2 mm or less. It is thus important that any substantial flow instability should be prevented in order to avoid the areas of inadequate or excessive barrier layer thickness which could otherwise occur, and to ensure a visually acceptable product.

The difficulty of avoiding non-uniform layer thickness increases with the degree of asymmetry of an asymmetric structure, and thus with the increasing thickness of a single reclaim layer provided as described above. In practice it has been found that hitherto a reclaim layer of about 30% by volume has been the maximum that can be incorporated into a multilayer plastics structure conventionally formed by coextrusion.

It is often desirable to incorporate reclaim levels into an asymmetric multilayer structure of 50% or more by volume, and one object of the present invention is therfore to provide an asymmetric, multilayer plastics sheet primarily for food applications, in which reclaim levels in excess of 30% may be present without the gross thickness variations in individual layers which have hitherto been associated with instability in polymer flow during the coextrusion process. The invention, however, is not to be considered as limited to sheet structures including reclaim (or barrier) layers, but has wide application to the manufacture of multilayer plastics structures whether in sheet or tube form, having a substantial degree of asymmetry for whatever reason.

Accordingly, from one aspect, the present invention provides an asymmetric multilayer plastics structure, comprising two multilayer components each having skin polymer layers with at least one further polymer layer therebetween in relation to which the component is substantially symmetrical, the components being formed separately by coextrusion and subsequently combined together by extrusion lamination.

"Extrusion lamination" in the preceding paragraph is used in accordance with its normal meaning, that is to say, it denotes the colamination of the two components by bringing them together when at least one of the components is still fluid following its coextrusion process, the remanent heat and relative fluidity of the (or each) still-fluid component causing the two components to bond intimately and securely together so that the resulting multilayer structure, after cooling, is unitary and has a high resistance to delamination.

As previously discussed, one application of the invention is an asymmetric multilayer plastics sheet for the production of plastics containers by thermoforming, the sheet having a thin barrier layer for gas and liquid impermeability and further having a single reclaim layer adjacent what is to be the outside surface of the container for giving the container desired mechanical properties of rigidity, impact resistance etc. A structure in accordance with the invention destined for such an application preferably has one of the components which includes the barrier layer ("the barrier component") and is arranged in five layers comprising, successively, skin polymer-adhesive-barrier-adhesive-skin polymer, whilst the second component ("the reclaim component") is a three layer laminate comprising successively skin polymer-reclaim-skin polymer. However, if the skin polymer layers of the reclaim component cannot be adequately bonded to the reclaim layer, then additional adhesive layers may be introduced into that component; likewise, for some applications the adhesive layers of the barrier component are omitted and the skin polymer layers of that component are bonded directly to the barrier layer.

Desirably, the thicknesses of the various layers as a percentage of the total thickness of the multilayer sheet of the preceding paragraph are as follows:

| Barrier Component | Skin Polymer | 10–15% |
|---|---|---|
| | Adhesive | 1–4% |
| | Barrier | 2.5–10% |
| | Adhesive | 1–4% |
| | Skin Polymer (x) | 5–10% |
| Reclaim Component | Skin Polymer (y) | 2.5–10% |
| | Reclaim | 40–60% |
| | Skin Polymer | 5–15% |

When adhesive layers are present in the reclaim component, they will usually be of a similar thickness to those recited above for the barrier component.

It is preferred that, overall, the barrier component should occupy 20–45% of the total sheet thickness, the reclaim component occupying the remaining 80–55%. The total of the sheet material material may advantageously lie within the range 0.15–8 mm.

According to a preferred feature of the present invention, the adjacent skin polymer layers of the two components, denoted (x) and (y) in the previous paragraph, are chemically compatible and are directly bonded to one another by the extrusion lamination of the components. However, if necessary, a suitable adhesive layer or layers can be coextruded with, and as part of, one or both of the components, and such as to bond the adjacent skin polymer layers indirectly together when the components are extrusion laminated together.

Suitable materials for the various layers of the two components are as follows:

Skin Polymers may comprise:
polypropylene homomopolymer (melt flow index 0.5–15)
Polypropylene copolymers (1–15% ethylene and typically 4–8% ethylene) (mfi 0.5–15)
polyethylene (density 0.915–0.965, mfi 0.55–15
polybutylene
polyesters (e.g. polyethylene terephthalate)
impact modified styrenes
styrene
acrylonitrile butadiene styrene (ABS) (Melt flow index is measured at 230° C. with a load of 2.16 kg in accordance with BS 2781: 720A in °/min).

Adhesive layers may comprise:
polyolefin copolymers, e.g. ethylene vinyl acetate (EVA)
chemically modified polyolefins and polyolefin copolymers,
styrene butadiene rubber copolymers
blends of the above adhesives Barrier Layers may comprise:
1. Melt extrudable copolymers and terpolymers containing in combination compounds selected from vinylidene chloride with vinyl chloride, methyl acrylate, methyl methacrylate, butyl acrylate acrylonitrile and butadiene.
2. Ethylene vinyl alcohol copolymers produced by alcoholysis, hydrolysis or saponification of ethylene vinyl acetate copolymers with an ethylene content not exceeding 50 Mol %

In a structure as briefly mentioned above having its components bonded together by an adhesive formed as an outer layer of one or both of the components, the adhesive may be any of the polymers listed above for the adhesive layers.

The present invention also provides, in accordance with a second aspect thereof, a process for producing an asymmetric multilayer plastics structure in which first and second substantially symmetrical multilayer plastics components are separately formed by coextrusion and subsequently combined by extrusion lamination to form a unitary asymmetric structure.

In accordance with a third aspect of the invention there is provided an asymmetric multilayer plastics structure made by a method as defined in the previous paragraph.

An apparatus and process for manufacturing an asymmetric multilayer sheet in accordance with the invention will now be described by way of example and with reference to the accompanying diagrammatic drawings, in which:

FIG. 1A shows the structure of the barrier component of the sheet before extrusion lamination to the reclaim component;

FIG. 1B shows the structure of the manufactured multilayer sheet; and

Figure 1:
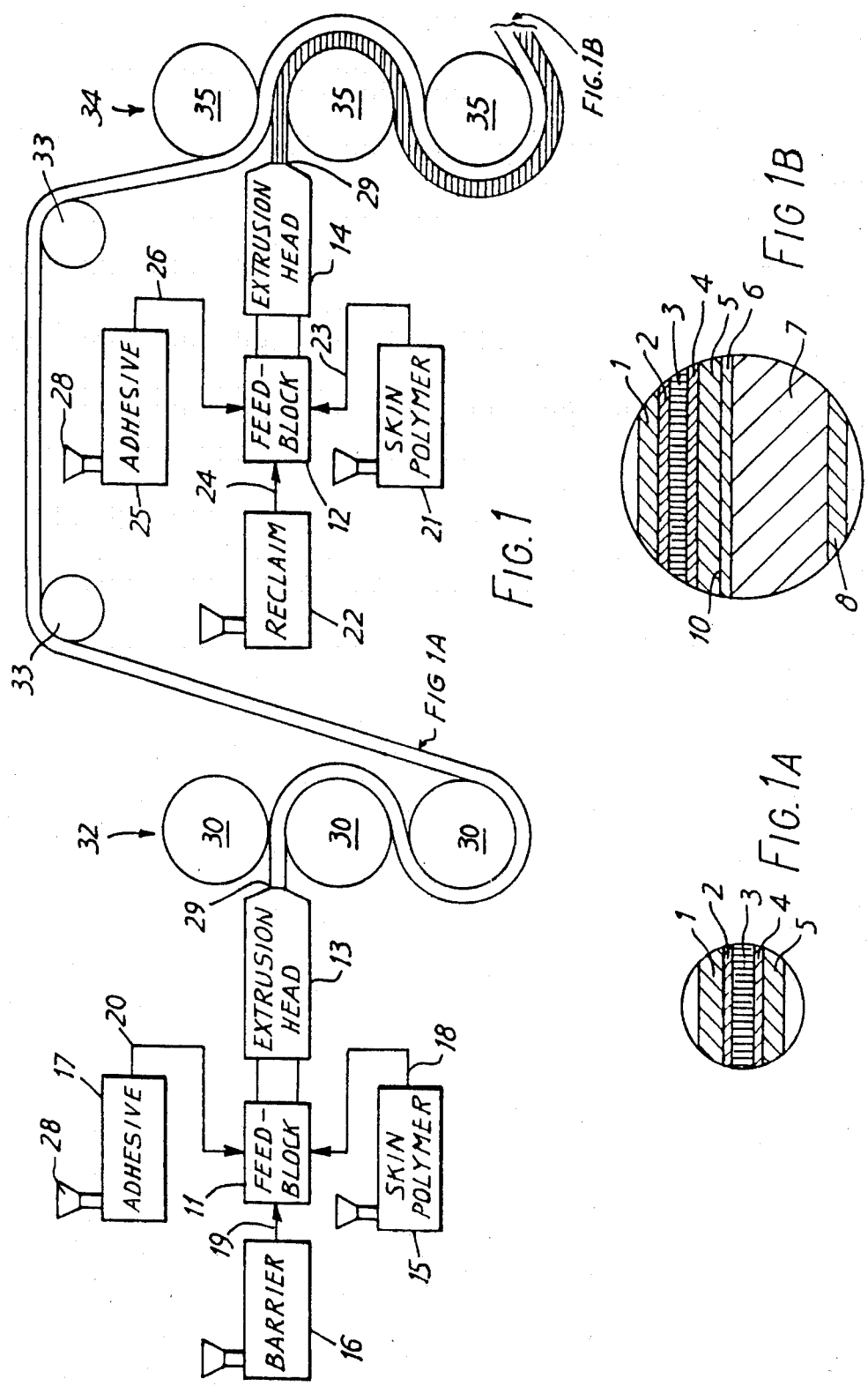
FIG. 1 shows the apparatus in side elevation.
Figure 2:
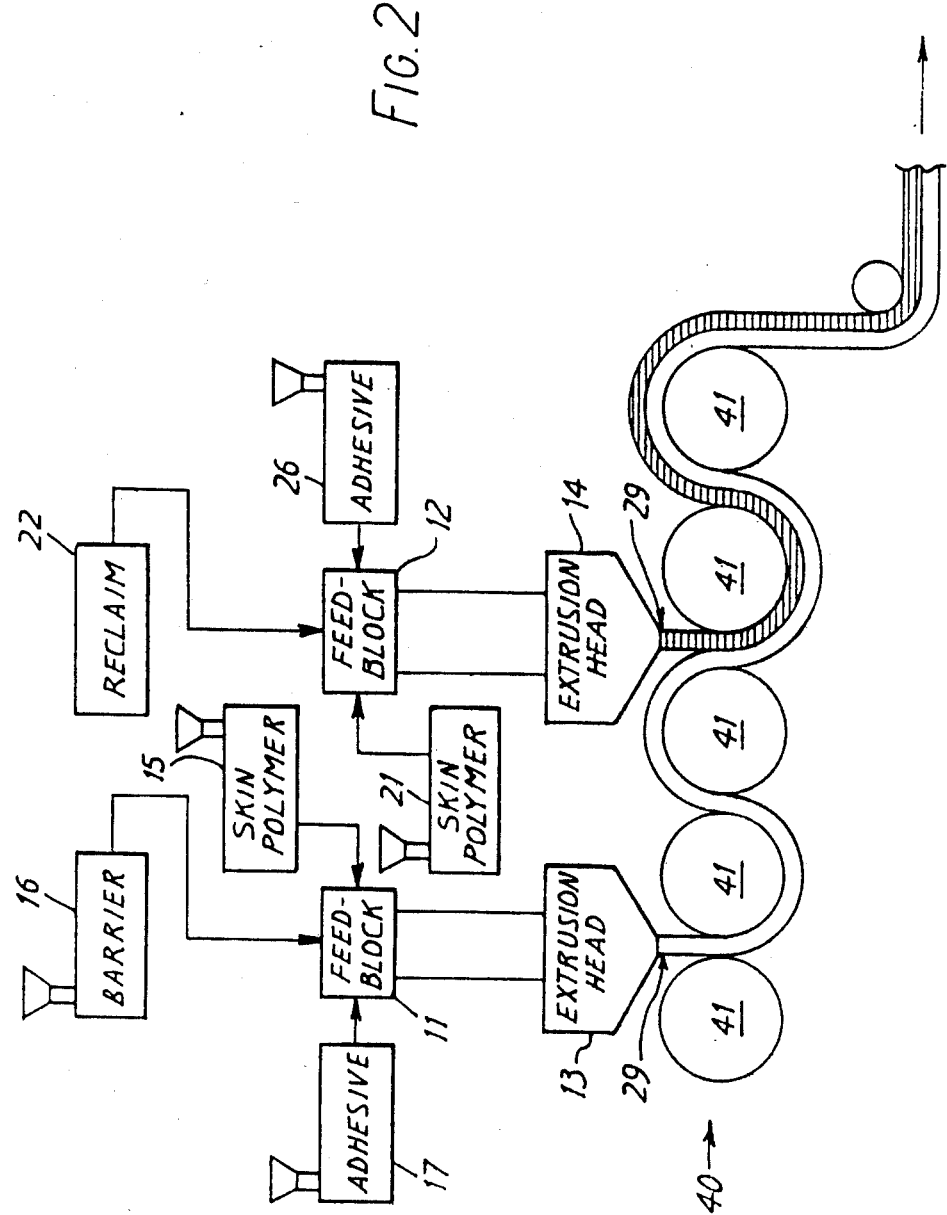
FIG. 2 is a view similar to FIG. 1 and showing a modification of the apparatus and process.

The apparatus of FIGS. 1 and 2 are both arranged to form an asymmetric multilayer plastics sheet having the structure shown in FIG. 1B. The sheet has skin layers 1, 5, 6 and 8, adhesive layers 2 and 4, a barrier layer 3, and a reclaim layer 7. As is described below, of these layers the layers 1 to 5 are coextruded to form a first "barrier" component of the sheet, and layers 6 to 8 are coextruded to form a second "reclaim" component of the sheet. The two components are extrusion laminated so that the skin layers 5 and 6 are fused directly together along an interface 10. To that end they are formed of chemically similar and therefore compatible polymers. As an alternative, however, a further, thin adhesive layer (not shown) may be coextruded as part of one or other (or both) of the components, so as to bond the components together at the interface 10.

The apparatus of FIG. 1 has two feed blocks 11, 12 with associated extrusion heads 13, 14. The feed block 11 is arranged to be fed from screw extruders 15, 16 and 17 through conduits or passages 18, 19, and 20; likewise, the feed block 12 is arranged to be fed from screw extruders 21 and 22 through conduits or passages 23 and 24. If an adhesive layer is required in or on the reclaim component, a further screw extruder 25 and associated conduit or pasage 26 is also connected to the feed block 12 as shown.

The screw extruders, feed blocks, extrusion heads and the conduits or passages connecting them together may be conventional for the production of multilayer sheet structures, the screw extruders accordingly having hoppers 28, and the extrusion heads having die orifices 29 at their exit ends.

The screw extruders 15, 16, 17, the feed block 11, and the extrusion head 13 are arranged in combination to form the barrier component of the sheet, and accordingly the extruders 15, 16, and 17 are respectively supplied with skin polymer, barrier polymer and adhesive polymer in granular form to their respective hoppers 28. The polymers are plasticated in the screw extruders and fed under pressure to the feed block.

In the feed block they are brought together, and the resulting polymer stream, formed of discrete but intimately contacting polymer melts, is passed to the extrusion head 13 to emerge from the die orifice 29 of the latter. As will be understood from FIG. 1A which shows the barrier component in cross section, the polymer stream is substantially symmetrical in relation to the barrier layer 3 at its centre, and the thicknesses of its individual layers 1 to 5 are within predetermined close tolerance limits, there being no significant instability of the polymer flow within the feed block 11 or the extrusion head 13 to cause gross non-uniformity in the layer thicknesses.

After emerging from the extrusion head 13 with the correct layer structure and overall thickness, the "barrier" component is passed around the cooling and polishing rolls 30 of a first cooling and polishing unit 32, and thence passes as a self-supporting but flexible sheet over guide rolls 33 and into the cooling and polishing unit 34 associated with the reclaim component of the manufactured product.

The reclaim component is formed by coextrusion substantially in the manner described above for the barrier component, and the operation of the screw extruders 21, 22 and (if provided) 25, the feed block 12 and the extrusion head 14 is therefore not described in detail. Again, as can be seen from items 6, 7 and 8 of FIG. 1B, the reclaim component is substantially symmetrical, and no significant polymer flow instability occurs within the feed block 12 or extrusion head 14.

The reclaim component emerges from the die orifice of the extrusion head 14, and whilst still in the form of a multilayer polymer melt is brought into contact with the underside of the barrier component as they pass together horizontally into the nip of two of the rolls 35 of the cooling and polishing unit 34. The pressure exerted by these rolls together with the remanent heat and fluidity of the barrier component causes the two components to be extrusion laminated together to form the desired sheet product having the structure shown in FIG. 1B.

If the components are adhesively bonded together, the adhesive layer to bond them together is formed on the appropriate surface of the barrier component or the reclaim component, or possibly on the appropriate surfaces of both components.

FIG. 1 shows one screw extruder (15) for forming both skin layers 1, 5 or the barrier component, and one screw extruder (21) for forming the skin layers 6, 8 of the reclaim component. In each case the feed block 11 or 12 is arranged to divide the skin polymer melt into two parts, one for each skin layer. It will, however, be appreciated that the feed block 11 or 12 for a component having different skin layers will be fed with skin polymer from two screw extruders 15 or 21. Moreover, the feed blocks and the screw extruder(s) for the skin polymer may be cross-coupled, so that there is at least one screw extruder serving both the feed blocks in common.

In a similar way, two or more screw extruders 17 or 25 may be provided for a component having two or more adhesive layers; as previously mentioned, these layers may be formed either internally or externally of the component. Again, cross-coupling may be appropriate in some applications.

Using the apparatus shown in FIG. 1, barrier and reclaim components for an asymmetric multilayer plastics sheet were individually coextruded as follows:

| Barrier Component Layer | Volume (%) | Layer Thickness (mm) | Output (Kg/Hr) |
|---|---|---|---|
| 1. Skin polymer | | | |
| Polypropylene homopolymer (mfi 5.5) | 25 | 0.14 | 20 |
| 2. Adhesive | | | |
| 50% EVA: 50% SBS | 4.5 | 0.03 | 4.0 |
| 3. Barrier | | | |
| VdC/VC Copolymer | 19.5 | 0.11 | 30.3 |
| 4. Adhesive | | | |
| As layer 2 | 7 | 0.04 | 6.2 |
| 5. Skin Polymer | | | |
| As Layer 1 | 44 | 0.25 | 35.3 |
| TOTAL | 100 | 0.57 | 95.8 |

| Reclaim Component Layer | Volume (%) | Thickness (mm) | Output (Kg/Hr) |
|---|---|---|---|
| 6. Skin polymer | | | |
| Polypropylene homopolymer (mfi 5.5) | 11 | 0.16 | 4.4 |
| 2. Reclaim (see next paragraph) | 71 | 1.01 | 32.4 |
| 3. Skin polymer | | | |
| As Layer 1 | 18 | 0.26 | 7.2 |
| TOTAL | 100 | 1.43 | 44.0 |

The reclaim material of the reclaim component was formed by regranulating a coextruded multilayer sheet material comprising skin polymer, adhesive and barrier polymers in the proportions (by volume) 85:5:10. The polymers were the same as those used to form the appropriate indiviudal layers of the barrier component as recited above.

The barrier component was introduced into the second cooling and polishing unit 34 with its skin polymer layers 1 and 5 at about ambient temperature, simultaneously with the reclaim component which had its own skin polymer layers 6, 8 at a temperature of approximately 200° C. The hot "tackiness" of the skin layer 6 of the reclaim component together with the compatibility of the adjacent skin layers 5, 6 resulted in successful extrusion lamination of the barrier and reclaim components to give a final asymmetrical multi-layer plastics sheet material having the following structure:

| Layer | Volume (%) | Layer Thickness (mm) |
| --- | --- | --- |
| 1. Skin polymer | 7 | 0.14 |
| 2. Adhesive | 1.5 | 0.03 |
| 3. Barrier | 5.5 | 0.11 |
| 4. Adhesive | 2.0 | 0.04 |
| 5. Skin polymer | 12.5 | 0.25 |
| 6. Skin polymer | 8 | 0.16 |
| 7. Reclaim | 51 | 1.01 |
| 8. Skin polymer | 13 | 0.26 |
| TOTAL | 100 | 2.00 |

In a series of foodstuff and beverage tasting trials, no significant organoleptic difference was found between the contents of containers made from the multi-layer sheet material of this example (with layer 1 providing the inside surface of the container), compared with those of a container made from a multilayer sheet material lacking the reclaim layer.

FIG. 2 shows a modification of FIG. 1 in which the cooling and polishing units 32 and 34 of FIG. 1 are combined in a single unit 40 formed of five cooling and polishing rolls 41 arranged in a single stand. The formation of the polymer melts and their combination by coextrusion are essentially as previously described with reference to FIG. 1, and are not described again in detail. As with FIG. 1, the barrier component is already in the form of a self-supporting but flexible sheet when the reclaim component is extrusion laminated to it. It is expected that, using the apparatus of FIG. 2, the extrusion lamination of the barrier and reclaim components will occur with the skin polymer layer 5 of the barrier component at 50° C.–100° C., and with adjacent skin layer 6 of the reclaim component at approximately 200° C.

Although particularly described in relation to the extrusion lamination of two components of which only one component is fluid when the components are brought together, within the scope of the invention are structures, apparatus and processes wherein the extrusion lamination is carried out when both of the components are still in a fluid state. In one such apparatus the barrier and reclaim components emerge from their respective extrusion heads and are brought together, whilst both still fluid, at the nip between a pair of opposed rollers of a cooling and polishing unit.

We claim:

1. An asymetric multi-layer plastics sheet structure which comprises:
   (a) a barrier layer of a polymer material;
   (b) first and second skin layers of a skin polymer, disposed one on either side of said barrier layer and bonded thereto said barrier layer and said first and second skin layers having been coextruded and forming a first multi-layer sheet component;
   (c) a reconstituted reclaim layer;
   (d) third and fourth skin layers of said skin polymer, disposed one on either side of said reclaim layer and bonded thereto;
   said third and fourth skin layers and said reclaim layer having been extruded and forming a second multi-layer sheet component;
   (e) an interface at which said first and third skin layers are bonded together by extrusion lamination of the said first and second multi-layer sheet components; said sheet structure thereby comprising at least six layers;
   (f) said reconstituted reclaim layer comprising waste material of said sheet structure;
   (g) the reclaim layer having a volume which is generally in excess of 30% of the total volume of the sheet structure up to generally 60% of the total volume of the sheet structure; and
   (h) said sheet structure thereby comprising at least six discrete layers and having said first skin layer spaced from a medial line of said sheet structure.

2. A sheet structure according to claim 1 wherein said first and third skin layers are directly bonded together at said interface.

3. A sheet structure according to claim 1 which further includes an adhesive layer at said interface by which said first and third skin layers are bonded together.

4. A sheet structure according to claim 3 wherein the material of the adhesive layer is selected from the group consisting of polyolefin copolymers, chemically modified polyolefins and polyolefin copolymers, styrene butadiene rubber copolymers and blends thereof.

5. A sheet structure according to claim 1 which further includes an adhesive layer between said barrier layer and each of said first and second skin layers.

6. A sheet structure according to claim 5 wherein the material of the adhesive layer is selected from the group consisting of polyolefin copolymers, chemically modified polyolefins and polyolefin copolymers, styrene butadiene rubber copolymers and blends thereof.

7. A sheet structure according to claim 1 wherein the skin polymer is selected from the group consisting of polybutylene homopolymer, polypropylene copolymer, polyethylene, polyputylene, polyester, impact modified styrene, styrene and acrylonitrile butadiene styrene.

8. A sheet structure according to claim 1 wherein the material of the barrier layer is selected from the group consisting of melt extrudable copolymers and terpolymers containing in combination compounds selected from vinylidene chloride with vinyl chloride, methyl acrylate, methyl methacrylate, butyl acrylate, acrylonitrile and butadiene.

9. A sheet structure according to claim 1 wherein the material of the barrier layer is selected from the group consisting of ethylene vinyl alcohol copolymers produced by alcoholysis, hydrolysis or saponification of ethylene vinyl acetate copolymers with an ethylene content not exceeding 50 mole per cent.

10. An asymetric multi-layer plastics sheet structure which comprises:
    (a) a thin layer of vinylidene chloride polymer;
    (b) first and second skin layers of a propylene polymer disposed one on either side of said thin layer;
    (c) first and second adhesive layers respectively bonding said first and second skin layers to said thin layer; said thin layer, said first and second skin layers and said first and second adhesive layers having been coextruded and forming a first multi-layer sheet component;
    (d) a reconstituted reclaim layer;
    (e) third and fourth skin layers of propylene polymer disposed one on either side of said reclaim layer and bonded directly thereto;
    said third and fourth skin layers and said reclaim layer having been extruded and forming a second multi-layer sheet component;

(f) an interface at which said first and third skin layers are directly bonded together by extrusion lamination of said first and second components; said sheet structure thereby comprising at least eight discrete layer ands having said first skin layer spaced from a medial line of said sheet structure; and
(g) said reconstituted reclaim layer comprising waste material of said sheet structure having a volume which is generally in excess of 30% of the total volume of the sheet structure up to generally 60% of the total volume of the sheet structure.

* * * * *